No. 874,046. PATENTED DEC. 17, 1907.
T. H. WHITING.
SCREEN FOR MOTOR VEHICLES.
APPLICATION FILED NOV. 12, 1906.
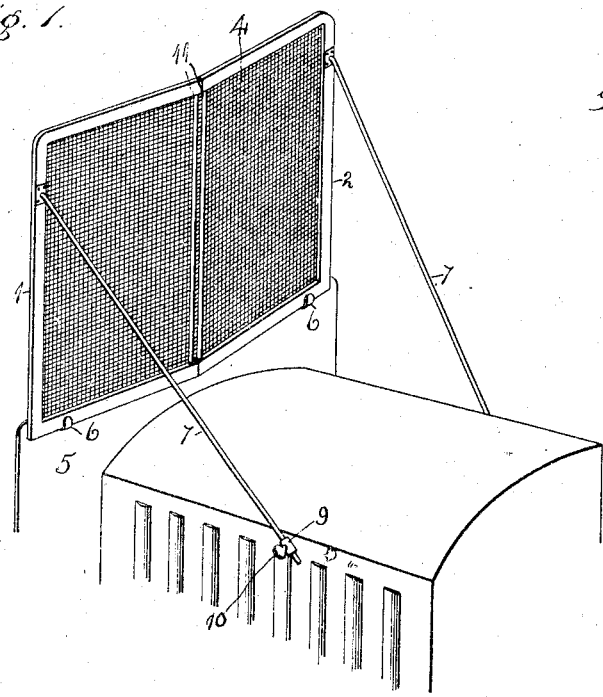
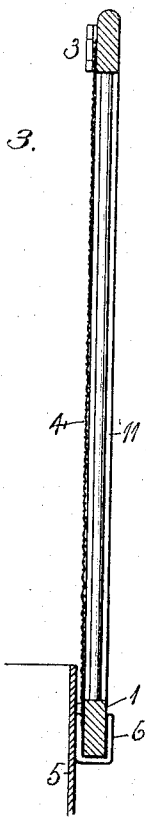
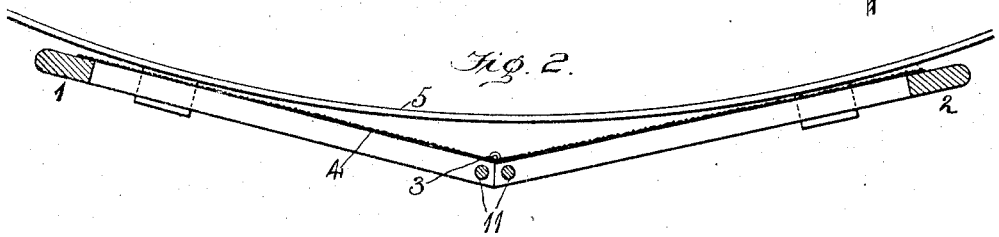
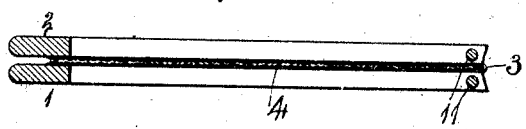
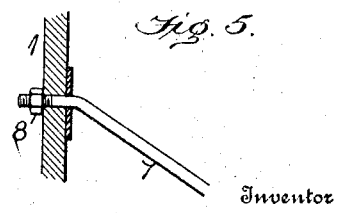
Witnesses
C. B. Clark
E. Behel
Inventor
Thomas Henry Whiting
By A. O. Behel
Attorney

UNITED STATES PATENT OFFICE.

THOMAS HENRY WHITING, OF ROCKFORD, ILLINOIS.

SCREEN FOR MOTOR-VEHICLES.

No. 874,046.

Specification of Letters Patent.

Patented Dec. 17, 1907.

Application filed November 12, 1906. Serial No. 343,135.

*To all whom it may concern:*

Be it known that I, THOMAS HENRY WHITING, a citizen of the United States, residing at Rockford, in the county of Winnebago and State of Illinois, have invented certain new and useful Improvements in Motor-Vehicles, of which the following is a specification.

The object of this invention is to construct a wire shield for the front of motor vehicles, one that can be readily detached from the vehicle and folded up to be stored away.

In the accompanying drawings. Figure 1 is a perspective view of the front portion of a motor vehicle containing my improved shield. Fig. 2 is a horizontal section of the shield. Fig. 3 is a vertical section near one of the supports for the shield. Fig. 4 is a horizontal section of the shield in its folded position. Fig. 5 is a vertical section through the connection of the brace rods with the shield.

The frame of my shield comprises two like halves 1 and 2 which are connected by the hinges 3. The meeting edges of these frames are angling to form stops so that they stand in V form as shown at Figs. 1 and 2.

A single wire netting 4 is connected with the two frames and two rods 5 connect the inner edges of the frames, one for each frame and located on the outside of the frames, or that part of the frame nearest the front of the vehicle.

From the dash 5 of the motor vehicle extend two hooks 6 near the sides of the dash. The screen frames are opened and their lower edges are located in the hooks 6 as shown at Figs. 1, 2 and 3 of the drawings which serve to hold the screen in the proper elevation with respect to the occupants of the vehicle.

Brace rods 7 one for each section of the screen has its upper end passed through an opening in the screen frame, and a nut 8 is turned on the screw-threaded end of the rod. These rods extend forward and downward to the front of the vehicle, and in this instance pass through eyes 9 secured to the vehicle front, and thumb screws 10 clamp them in connection with the eyes. These brace rods serve to hold the screen in an elevated position as shown at Fig. 1.

The rods 11 serve to protect the wire netting 4 at the point of the hinge connection between the frames 1 and 2, and also serve to strengthen the frames and offer the least obstruction to the vision, and the passage of light and air through the netting.

When the screen is not in use, the brace rods 7 are removed and the frames folded as shown at Fig. 4, and in this compact form it can be stored away in the various compartments of the vehicle.

The netting is of a mesh to permit light and air to pass through, and at the same time arrest the dust and dirt particles which the vehicle raises in its running movement. Insects cannot pass through the netting and it therefore offers great protection to the faces of the occupants of the vehicle.

I claim as my invention.

1. A screen for motor vehicles comprising two like sections hinged together, the meeting edges of the sections beveled to form a stop to the opening movement of the sections.

2. A screen for motor vehicles comprising two like sections hinged together, the meeting edges of the sections beveled to form a stop to the opening movement of the sections, and rods located at the meeting edges of the sections.

3. A screen for motor vehicles comprising two like sections hinged together, the meeting edges of the sections beveled to form a stop to the opening movement of the sections, and a single wire covering for both sections.

THOMAS HENRY WHITING.

Witnesses:
J. M. ALLEN,
J. A. MILLER.